United States Patent

[11] 3,626,468

| [72] | Inventor | James E. Hanson<br>Carter, S. Dak. 57526 |
|---|---|---|
| [21] | Appl. No. | 844,992 |
| [22] | Filed | July 25, 1969 |
| [45] | Patented | Dec. 7, 1971 |

[54] CREEP FOR AN ANIMAL FEEDER
3 Claims, 4 Drawing Figs.

[52] U.S. Cl. ................................................ 119/60,
119/20, 119/58, 119/59, 119/63
[51] Int. Cl. .................................................. A01k 5/00
[50] Field of Search ........................................ 119/59, 52,
53, 51, 53.5, 20, 60, 63, 58

[56] References Cited
UNITED STATES PATENTS

| 3,020,881 | 2/1962 | Strom | 119/58 |
|---|---|---|---|
| 1,468,205 | 9/1923 | Julian | 119/53 |
| 1,468,668 | 9/1923 | Mitchell | 119/52 |
| 2,863,419 | 12/1958 | Murrell | 119/20 |
| 2,933,062 | 4/1960 | Geerlings | 119/52 |
| 2,988,047 | 6/1961 | Hurdle | 119/52 |
| 2,701,549 | 2/1955 | Jones | 119/52 |
| 3,124,105 | 3/1964 | Stapleton | 119/61 |

*Primary Examiner*—Aldrich F. Medberry
*Attorney*—Beveridge & DeGrandi

ABSTRACT: A creep comprises an open framework including a pair of separate, rigid, substantially semicircular sections which are secured to one another to provide an assembled circular framework having a central circular opening for receiving a conventional animal feeder. The creep includes spaced vertical members at the outer periphery thereof to limit access to the interior of the creep, and weather protection means is supported at the upper inner portion of the creep.

INVENTOR
JAMES E. HANSON

INVENTOR
JAMES E. HANSON

BY Beveridge & DeGrandi
ATTORNEYS

CREEP FOR AN ANIMAL FEEDER

BACKGROUND OF THE INVENTION

The present invention relates to a creep for use with a conventional animal feeder which may be utilized for feeding pigs, calves and the like. When feeding such animals, it is often necessary or desirable to provide a creep in association with the feeder so as to allow young animals to freely enter the creep and utilize the feeder while excluding adults therefrom.

Various creep feeder arrangements are well known in the prior art. Conventional constructions present a number of difficulties and disadvantages in use. In many instances, it is difficult to load the feeder, and further the feeder and creep cannot be readily separated so that the feeder can be used independently of the creep.

Some arrangements now in use are of such a construction that it is necessary for an animal such as a calf to back out of the creep after it has entered in the normal manner. There is a natural fear of such an animal to enter a creep where it will be necessary to back out, or where it may be trapped by larger animals.

Conventional creeps are also of limited versatility since they are often adapted to be employed with only one particular type of animal, whereas it is often desirable to employ a single creep which can be modified so as to be used with different types of animals at different times.

Many known creep constructions fail to provide any sort of weather protection for the associated feeder whereby the feed is not protected from moisture in the event of rain.

SUMMARY OF THE INVENTION

The creep of the present invention comprises an open framework including a pair of separate, relatively rigid, substantially semicircular sections which are secured to one another to form an assembled framework which defines a central opening for receiving an animal feeder and which substantially entirely surrounds an associated feeder.

The two sections of the framework can be readily separated from one another to facilitate loading of the feeder with grain and the like. Additionally, the framework sections can be completely removed from the feeder so that the feeder can be employed independently of the creep.

To assembled framework of the present invention substantially entirely surrounds an associated feeder so that animals such as calves or pigs can enter the creep from any direction, can move freely within the creep in safety, and can then leave the creep at any position around the outer periphery thereof.

A peripherally extending means can be provided at an intermediate vertical position on the outer periphery of the sections of the framework so as to readily convert the creep from use with calves and the like to a creep which is particularly adapted for use with pigs, for example.

Weather protection means may also be provided at the inner upper portion of the framework so as to protect the feeder in the associated feeder means when the lids of the feeder are in an elevated position for feeding calves.

DESCRIPTION OF THE PREFERRED EMBODIMENTS

Figure 1:
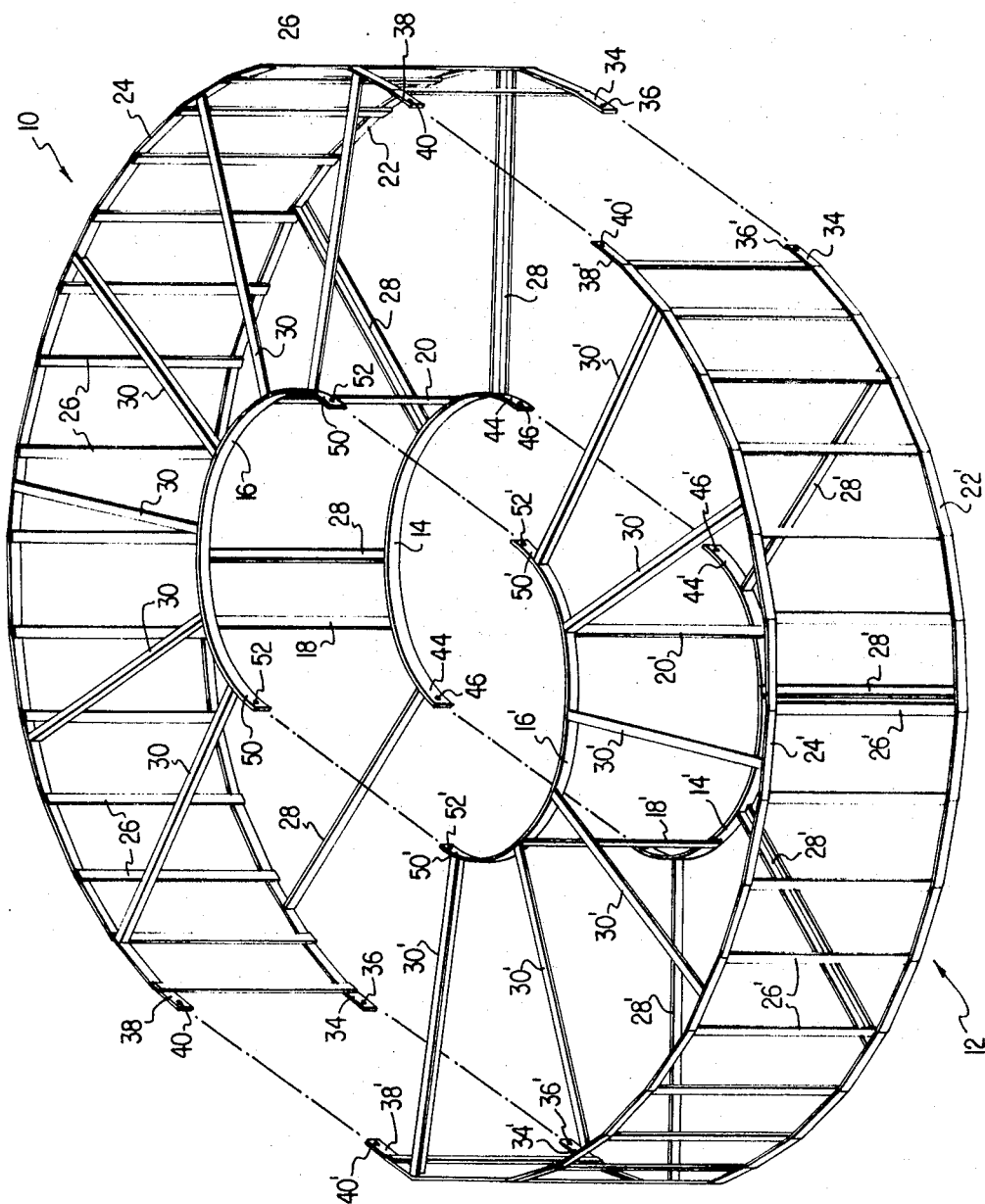
FIG. 1 is a top perspective exploded view illustrating the two sections of the framework of the creep in disassembled spaced relationship to one another.
Figure 2:
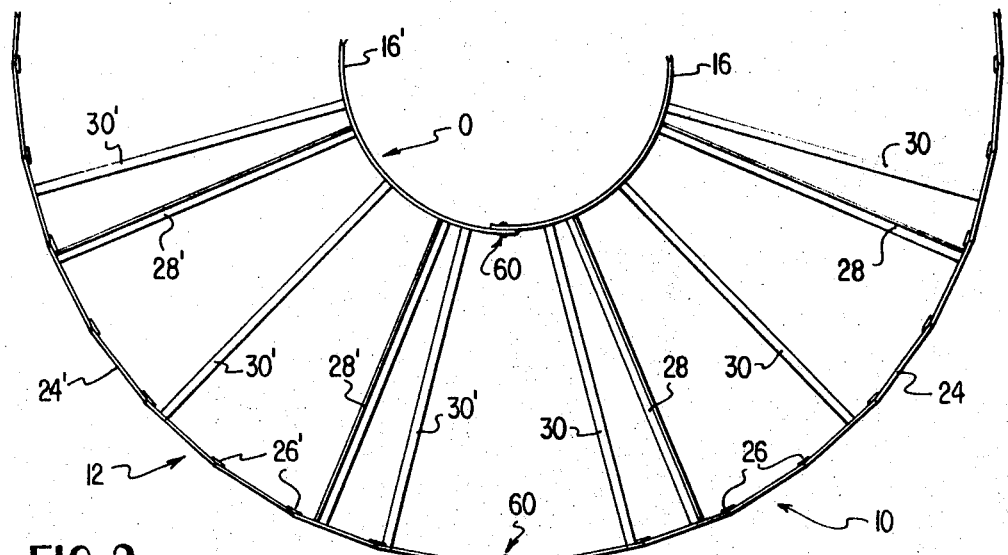
FIG. 2 is a top view of a portion of the framework after the two sections thereof have been secured to one another.
Figure 3:
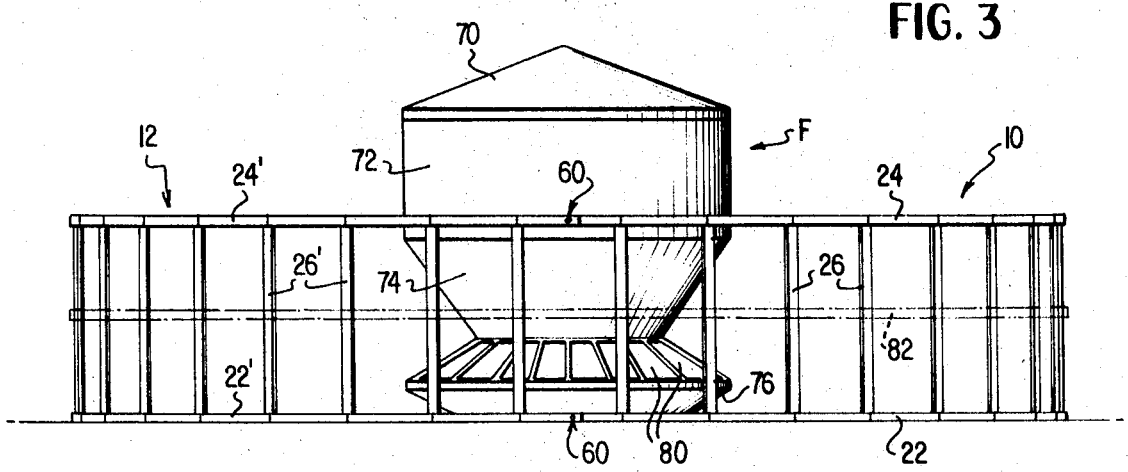
FIG. 3 is an elevation illustrating the creep in operative surrounding relationship to a conventional animal feeder.

Referring now to the drawings where like reference characters designate corresponding parts throughout the several views, a first form of the invention is shown in FIGS. 1—3 inclusive. The creep comprises an open framework including a pair of separate, relatively rigid, substantially semicircular sections indicated generally by reference numerals 10 and 12. These two sections are of substantially identical configuration, and according, the details of construction of section 10 are described hereinafter, the corresponding parts of section 12 being given the same reference numerals primed.

As seen most clearly in FIG. 1, section 10 includes a lower arcuate, generally semicircular inner circumferentially extending member 14 and an upper similar inner circumferentially extending member 16, the members 14 and 16 being rigidly interconnected with one another by spaced vertical members 18 and 20. It should be understood that the various members of the framework are preferably formed of a rigid metallic material such as steel and the like, and the various members of each section are rigidly interconnected as by welding.

Section 10 also includes a lower outer circumferentially extending member 22 and an upper outer circumferentially extending member 24. As shown, members 22 and 24 are formed of a plurality of straight segments interconnected with one another although it is apparent that each of members 22 and 24 may comprise a single arcuate member if so desired. Outer circumferentially extending members 22 and 24 are rigidly interconnected with one another by a plurality of substantially vertically extending parallel members 26, these members being substantially uniformly spaced from one another around the entire periphery of the section and defining spaces of sufficient dimension to allow young animals to enter and leave the creep while preventing adult animals from gaining access to the interior of the creep.

The lower inner circumferentially extending member 14 is rigidly interconnected with the lower outer circumferentially extending member 22 by a plurality of generally radially extending members 28 each of which may comprise an angle member. Upper inner circumferentially extending member 16 is rigidly interconnected with upper outer circumferentially extending member 24 by a plurality of generally radially extending members 30 which may also comprise angle members.

Lower outer circumferentially extending member 22 includes opposite end portions 34 each of which has hole 36 formed therethrough. Upper outer circumferentially extending member 24 has opposite end portions 38 each of which has a hole 40 formed therethrough.

Lower inner circumferentially extending member 14 has opposite end portions 44 each of which has a hole 46 formed therethrough, and upper inner circumferentially extending member 16 has opposite end portions 50 each of which has a hole 52 formed therethrough.

When it is desired to secure sections 10 and 12 to one another in the assembled relationship as shown in FIGS. 2 and 3, the two sections are juxtaposed with respect to one another as seen in FIG. 2, it being noted that the end portions of the upper and lower circumferentially extending members are offset with respect to one another such that they are adapted to fit together as seen in these FIGS. When the holes in the end portions of the circumferentially extending members are aligned with one another, suitable fastening means such as nut and bolt assemblies indicated by reference characters 60 are inserted through the aligned holes to rigidly secure the two framework sections together.

It is apparent that when the two semicircular sections are secured to one another to form the assembled framework, the overall framework is substantially circular in configuration and defines a central circular opening indicated by reference character 0 in FIG. 2 which is adapted to relatively snugly receive a conventional feeder indicated by reference character F in FIG. 5 of the drawings.

Feeder F is of known construction and includes a removable tapered cover 70 which fits over a hopper 72 containing feed therein. The hopper includes a lower inwardly tapered portion 74 which is in communication with a feeding trough 76 at the bottom of the feeder. A plurality of pivoted lids 80 are supported adjacent the feeding trough and are adapted to be lifted upwardly and supported in raised position when feeding calves and the like.

Figure 4:
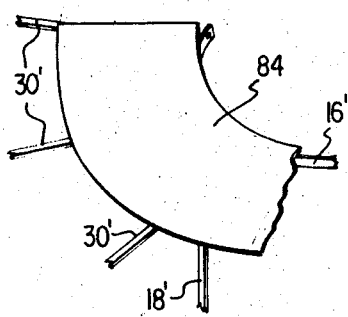
FIG. 4 is a top perspective view of a portion of a modified form of the invention including weather protection means.

Referring now to FIG. 4, a modified form of the invention is illustrated wherein a weather seal 84 is provided at the upper inner portion of each of the framework sections. This weather protection means is formed of a suitable weatherproof material such a sheet metal or the like, the weather protection means extending outwardly from the inner periphery of each section a distance of about 2 feet and extending completely along the inner periphery thereof so that when the two sections are assembled, a continuous weather protection means will be provided about the associated feeder in overlying relationship to the lids 80 so as to protect feed within the feeding trough when the lids are in raised position.

The weather protection means preferably slopes downwardly and outwardly so that rainwater and the like will drain off of the weather protection means.

The spaced members 26 and 26' of the two sections limit entry into the creep of calves while preventing adult cows from entering the creep. If it is desired to further limit access of animals to the interior of the creep, a peripherally extending means 82 may be mounted at an intermediate vertical position along the vertical members 26 and 26' as indicated by phantom line 82 in FIG. 3. Means 82 may comprise a strip of metal which is secured in position as by clamping it in place or by providing suitable holes for receiving fastening means such as nut and bolt assemblies and the like.

In a typical example of the present invention, the diameter of the central opening defined by the assembled framework may be approximately 62 inches and the outside diameter of the overall framework about 182 inches. The height of the framework may be about 34 inches, and the vertical members 26 and 26' may be spaced approximately 14 inches apart. It is apparent that the number and spacing of the various members of the framework may be varied as desired.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. An animal-feeding creep rack comprising at least two separable relatively rigid frame assemblies each including outer and inner frame portions and spacers rigidly connecting said outer and inner frame portions in fixed spaced relation, said outer frame portions each including vertically spaced top and bottom outer rail members and a plurality of elongated generally vertical frame members extending between and rigidly mounted on said outer rail members at spaced intervals there around and cooperating therewith to define a peripheral fence section having access openings defined by said outer rail members and adjacent ones of said frame members, said access openings being of a size to exclude animals larger than a certain size, said inner frame portions each including vertically spaced top and bottom inner rail members and a plurality of elongated generally vertical frame members extending between and rigidly mounted on said inner rail members at spaced intervals therealong and cooperating therewith to define an inner fence sections, said inner fence sections on said frame assemblies cooperating to define a central feed compartment in said creep rack for containing a supply of feed, said inner fence section having access openings defined by said inner rail members and adjacent ones of said vertical frame members mounted thereon to permit animals to feed therethrough from a supply of feed in said central compartment, said spacers including a plurality of elongated generally radially extending frame members connected to and rigidly joining said inner and outer fence sections, and connector means releasably connecting said frame assemblies to define a closed animal-feeding creep rack having a peripheral feeding area surrounding the central feed compartment, sad central feed compartment being dimensioned to receive a conventional animal feeder therein, said connector means being removable to permit separation of said frame into the plurality of frame assemblies for transportation of said animal-feeding creep rack in sections.

2. The animal feeding creep rack as defined in claim 1 wherein said top inner rail member is supported at a height substantially as great as the height of said top outer rail whereby said top inner rail member is positioned to engage a conventional animal feeder positioned within said central feed compartment to stabilize the feeder against movement by animals feeding in said creep rack. rack.

3. The animal-feeding creep rack as defined in claim 1 wherein each of said separable frame assemblies is substantially semicircular in configuration whereby the assembled creep rack is substantially circular with said inner fence sections cooperating to define a substantially circular central feed compartment.

* * * * *